UNITED STATES PATENT OFFICE.

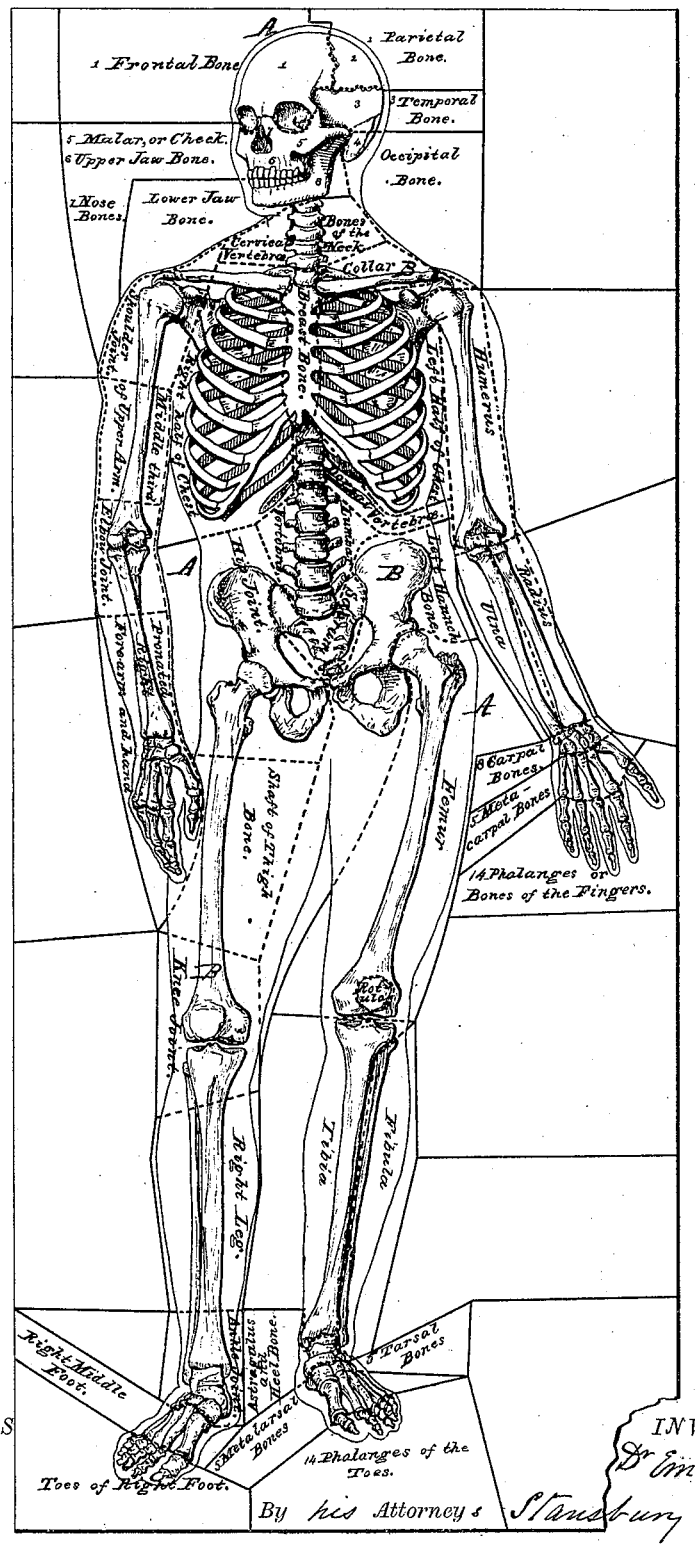

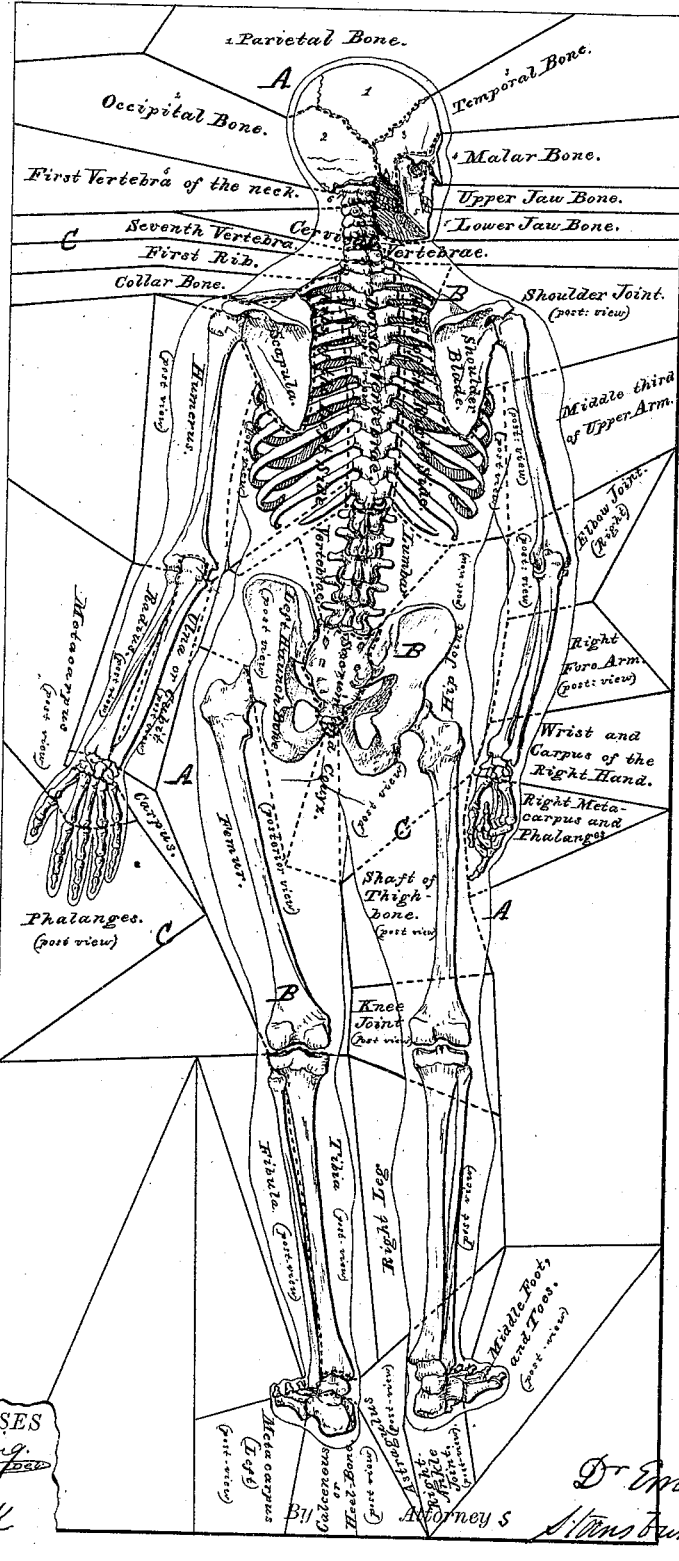

EMIL STEIGER, OF PRAIRIE DU CHIEN, WISCONSIN, ASSIGNOR OF ONE-HALF HIS RIGHT TO GEORGE M. RISING.

IMPROVEMENT IN EDUCATIONAL PUZZLES.

Specification forming part of Letters Patent No. 175,519, dated March 28, 1876; application filed February 8, 1876.

*To all whom it may concern:*

Be it known that I, Dr. EMIL STEIGER, of Prairie du Chien, Crawford county, Wisconsin, have invented an Improved Method of Instructing Children in Anatomy; and I do hereby declare the following to be a full and correct description of the same, reference being had to the accompanying drawings, in which—

Figure 1 is a front view, and Fig. 2 a rear or back view, of a skeleton of the human frame.

My invention relates to an improved method of instructing children in anatomy by means of a divided or dissected chart of a human skeleton, each of the parts having marked thereon the proper name belonging to the same.

An outline of the human form, A, is drawn or printed upon paper, card-board, or other suitable material large enough to leave a margin outside of this outline. Within this outline the forms of the component parts of a skeleton, B, are in like manner drawn, each being arranged in its proper place, and having marked thereon or near it its anatomical or common name, as clearly shown in both figures. The chart thus made is first divided by lines C, shown solid outside of the figures and dotted where they pass through the same, and is then cut or separated on the lines into as many parts as they represent. In running the lines to form the boundaries of the different parts of the chart, it is only necessary to have them embrace some well-known portion or part of the skeleton, as the frontal bone, lower jaw-bone, breast-bone, hip-joint, knee-joint, as shown in Fig. 1, or parietal bone, dorsal vertebræ, &c., as shown in Fig. 2. If desired, these may have attached the name in common use of the part, as well as the technical anatomical name, as scapula, or shoulder-blade, as shown in the same figure.

When the chart is thus made, and marked and cut up into pieces, as herein described, the object of the invention will be readily understood. The sections are placed in the hands of the pupil or school child with directions to build up or construct the figure of the skeleton, which, when properly put together, they will form. The labor of doing this becomes not only interesting and fascinating to the youthful mind, but also highly instructive, and in a short time not only the whole structure of the skeleton, but also the names of all its parts, become familiar.

Having thus described my invention, what I claim is—

A chart of a human skeleton dissected or cut into pieces, each piece embracing an important part of the structure, and having its appropriate name marked thereon, substantially as herein described, for the purpose of instructing children in the science of human anatomy, as set forth.

The above specification of my said invention signed and witnessed at Prairie du Chien, this 22d day of January, A. D. 1876.

DR. EMIL STEIGER.

Witnesses:
  Rev. ALEX. F. SAMUELS,
  JOHN PLUMMER.